INVENTORS
MASUO HOSOKAWA
EIICHI TOMON
BY
ATTORNEY

United States Patent Office 3,430,924
Patented Mar. 4, 1969

3,430,924
CONTINUOUS MIXING MACHINE
Masuo Hosokawa, 48 Ueno 9-chome, Toyonaka-shi, and Eiichi Tomon, Tokyo-to, Japan; said Tomon assignor to said Hosokawa
Filed Dec. 7, 1967, Ser. No. 688,842
Claims priority, application Japan, Dec. 12, 1966, 41/81,425
U.S. Cl. 259—6     14 Claims
Int. Cl. B01f 7/08, 5/12

ABSTRACT OF THE DISCLOSURE

This invention relates to a continuous mixing machine, in which a forwarding screw feeder and a returning screw feeder are disposed in parallel with a central line, said feeders are revolved around said central line while said feeders are rotated, a supply inlet for raw material is provided at one end of a container which surrounds said feeders, an exhausting outlet therefor is provided at the other end thereof, and mixing of said raw material is continuously performed.

---

This invention relates to a device for mixing powder or particle material, especially to a device for chemical industry or provisions industry for mixing powder or particle raw materials of a plural kind.

In the manufacture of provisions, fodders, medicines, agricultural medicines, industrial chemicals, pottery products, plastics, etc., a process of mixing raw materials is often included, and in the case that a uniform mixture is required a batch type mixing machine is generally used. However, since feeding and taking out of the raw materials must be done intermittently in the case of the batch type mixing machine, its efficiency is low. Although there has been such mixing machines in which the feeding and the taking out of the raw materials are done continuously, the raw materials tend to be separated depending upon the particle size and specific gravity of the particles, thus a uniform mixture cannot be expected therefrom, and, therefore, in the case that a uniform mixture is required the batch type mixing machine is employed in practice sacrificing the efficiency.

A major object of this invention is to provide a mixing machine which is capable of providing a highly uniform mixture, while the feeding and the taking out of the raw materials are done continuously.

According to this invention, the mixing machine is provided with a plurality of screw feeders which are parallel with a central line being disposed at each side of or surrounding said central line, and these feeders are contained in a common chamber. At one end of the chamber a supply inlet of the raw materials to be mixed is opened, and an exhausting outlet of the mixed raw materials is opened at the other end thereof. At least one of these feeders rotates to move the raw materials within the chamber from the supply inlet toward the exhausting outlet, and at least one of the feeders rotates to reversely move the raw materials within the chamber from the exhausting outlet toward the supply inlet. And, all of these feeders revolve around said central line. Thereby, when raw materials are supplied continuously from the supply inlet into the chamber, the raw materials within the chamber receive alternatingly the forwarding action of a feeder in the direction from the supply inlet towards the exhausting outlet and the returning action of a feeder in the direction from the exhausting outlet towards the supply inlet and are well mixed, further as a whole the mixture slowly moves from the supply inlet to the exhausting outlet, and well mixed raw materials are continuously exhausted from the exhausting outlet.

In the case that the number of feeder for moving the raw materials within the chamber from the supply inlet toward the exhausting outlet and the number of feeder for reversely moving said raw material are same and the pitch, diameter and rotation speed of respective feeders are equal one to the other, it may give an impression that the movement of the raw materials within the chamber from the supply inlet toward the exhausting outlet may not be smoothly performed, but in practical operation said movement is performed quite smoothly.

In order to facilitate the movement of the raw materials within the chamber, the efficiency of the feeder for moving the raw materials from the supply inlet toward the exhausting outlet may be raised than that of the feeder for reverse movement. For this purpose, it may be so done that the pitch of the screws of the former feeder is made larger compared to that of the latter feeder, the former's rotation speed is increased or the diameter of the screws is made larger. Or, it can be also so done that the effective area of the screws of the latter feeder is made narrower by providing a gap between the helical plate and the rotary shaft of the latter feeder or by other means.

Other objects and features of this invention will be more clearly understood from the description in the patent claims and an explanation hereinafter made referring to the attached drawings; wherein:

Figure 1:
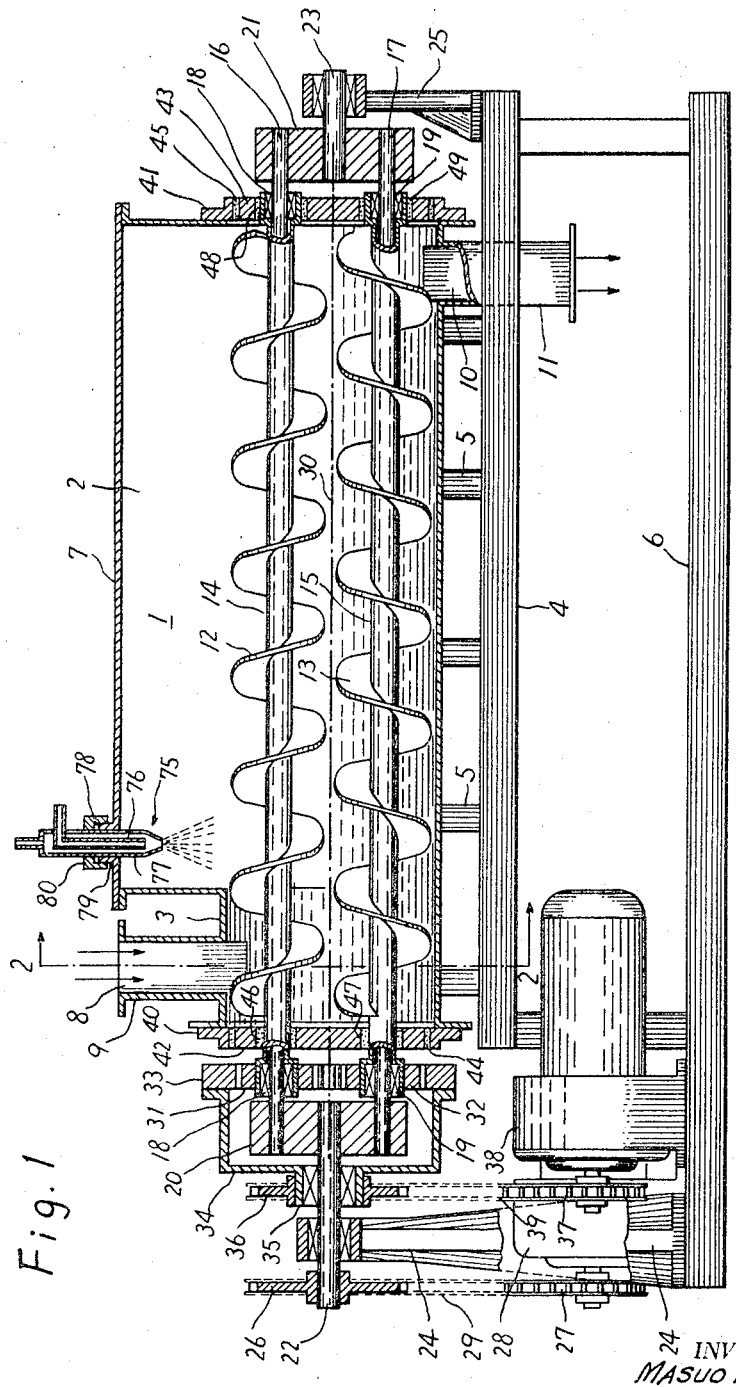
FIGURE 1 is a partially sectional side view of a typical example of embodiment of this invention having a U-shaped mixing chamber.
Figure 2:
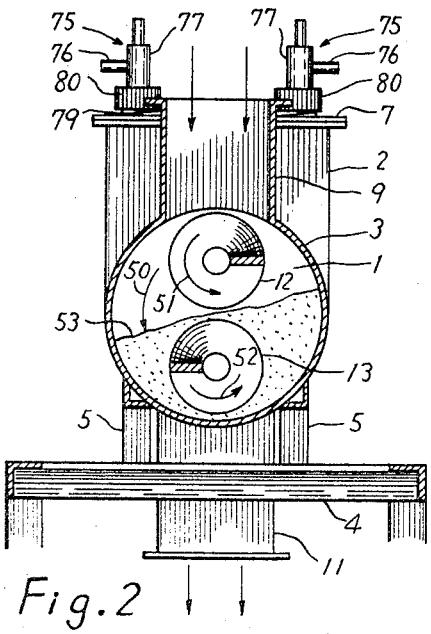
FIGURE 2 is a sectional view taken along the line 2—2 of FIGURE 1.

Rereffing to FIGURES 1 and 2 in which a typical example of this invention is shown, 1 is a mixing chamber which consists of a laterally long portion 2 having a U-shaped section and a short cylindrical portion 3 which continues to one end of said portion 2. The mixing chamber 1 is supported by short legs 5, 5 . . . on a frame 4 which is provided horizontally. The frame 4 is assembled above a base 6. An upper opening of the U-shaped portion 2 of the chamber 1 is closed by a cover 7, a supply conduit 9 for constituting a supply inlet 8 is provided on the upper face of the cylindrical portion 3, and an exhausting conduit 11 for constituting an exhausting outlet 10 is provided in the lower face of the U-shaped portion 2 at an end opposite to that of the supply inlet 8.

Screw feeders 12 and 13 are horizontally provided in the chamber 1 along substantially the whole length thereof. Rotary shafts of the feeders 12 and 13 are of hollow pipes, core rods 16 and 17 are inserted into the insides thereof, and both ends of the rotary shafts 14 and 15, respectively, are supported at the outside of the chamber 1 to the core rods 16 an 17 by means of bearings 18, 18 and 19, 19, respectively. Both ends of the core rods 16 and 17 are mutually coupled by coupling members 20 and 21, and rotary shafts 22 and 23 are extending respectively from the center of each of the coupling members. The rotary shaft 22 is pivoted on a supporting rod 24 which is erected on the base 6, and the rotary shaft 23 is pivoted on a supporting rod 25 which is extending upwardly from an end of the frame 4.

A chain sprocket 26 is fixed to the tip end of the rotary shaft 22, and a geared motor 28 having an opposing chain sprocket 27 is mounted to the base 6, and a chain 29 is put between and over these sprockets. Thereby, when the geared motor 28 rotates, its rotation drives the shaft 22, and as a result thereof the feeders 12 and 13 revolve around the central line 30 which passes through the shafts 22 and 23.

At one end of the feeder rotary shafts 14 and 15 gears 31 and 32 are provided respectively, and these gears are engaging with an internal gear 33. This internal gear 33 is supported by an opening edge of a cup-like support 34, and a boss 35 provided in the center of the support 34 is supported by the shaft 22. The boss 35 is provided with a chain sprocket 36, a geared motor 38 having a chain sprocket 37 opposing said chain sprocket 36 is mounted to the base 6, and a chain 39 is put between and over these sprockets. Thereby, when the geared motor 38 rotates the internal gear 33 is driven to rotate the gears 31 and 32, and thereby the feeders 12 and 13 are caused to rotate.

At two ends of the chamber 1 members 40 and 41 are attached respectively thereto, and discs 42 and 43 are supported in circular windows which are opened in respective members centering around the central line 30. These discs 42 and 43 are provided with circular holes respectively through which the feeder rotary shafts 14 and 15 penetrate. In the gaps between the window walls of the members 40 and 41 and the circumferences of the discs 42 and 43 such soft packings 44 and 45 as felt or leather are inserted respectively. On the other hand, such soft packings 46, 47, 48 and 49 as felt or leather are packed into the gaps between the circular holes of the discs 42 and 43 and the feeder shafts respectively. The discs 42 and 43 rotate as the feeders 12 and 13 revolve, and these feeders freely rotate within the holes of these discs. The packings packed in said gaps prevent the raw materials within the chamber 1 from leaking to the outside.

When the geared motors 28 and 38 rotate, the internal gear 33 rotates and also the gears 31 and 32 revolve engaging with the internal gear 33, and therefore the gears 31 and 32 start rotating motion. Thus, the screw feeders 12 and 13, while revolving in the direction of an arrow 50 shown in FIGURE 2, rotate in same direction at the same time as shown in arrows 51 and 52. On the other hand, as the pitches of the feeders 12 and 13 are mutually opposite as shown in FIGURE 1, the feeder 12 makes a forwarding action of the raw materials from the supply inlet 8 toward the exhausting outlet 10, while the feeder 13 makes a returning motion in the direction opposite thereto. With respect to raw material 53 which is supplied to the chamber 1 from the supply inlet 8, these forwarding motion and the returning motion act alternatingly in accordance with the cycle of said revolution, and while the raw material is sufficiently mixed it is moved toward the exhausting outlet 10. When the raw material is continuously supplied from the supply inlet 8, mixed material is continuously fed out from the exhausting outlet 10.

Figure 3:
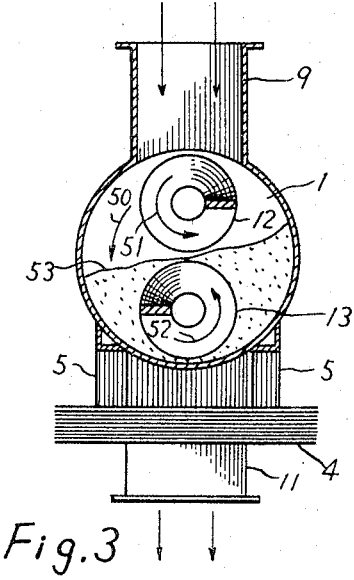
FIGURE 3 is a sectional view of other example of embodiment of this invention having a cylindrical mixing chamber, corresponding to that of FIGURE 2.

As is shown in FIGURE 3, the mixing chamber 1 may be formed in a cylindrical shape having a little larger inner diameter than outer diameter of the revolution of the feeders 12 and 13 all over the length thereof. The contour of this mixing chamber has no dead corner at all, thereby the raw material can be prevented from adhering to the chamber wall and accumulating thereat, and this effect is especially large in the case that the raw material is easily chargeable or is containing water component tending to adhere to the wall or forming lumps.

Figure 4:
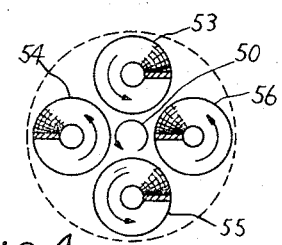
FIGURES 4–6 are diagrams of other examples of feeders according to this invention corresponding to the feeders shown in FIGURE 2.

The number of the feeders is not limited to two, it may be more than two, but it is preferable that they are of an even number. In the case of an even number of feeders, it is preferable that, as is shown in FIGURE 4, the forwarding feeders 53 and 55 and the returning feeders 54 and 56 are alternatingly provided along the revolution direction 50.

Figure 8:
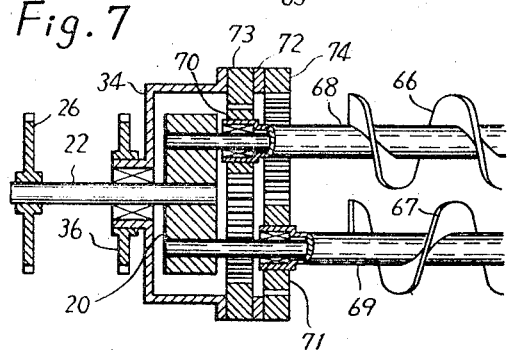
FIGURE 8 is a side view of another example of driving mechanism of the feeders in accordance with this invention.

In the mixing machine of this invention, it may be sometime desirable that processing quantity is increased even with a sacrifice to some extent of the accuracy of the mixing. In such case, the efficiency of the forwarding feeders may be raised than that of the returning feeders. How to raise the efficiency of the forwarding feeders than that of the returning feeders is shown in FIGURES 5 and 8.

Figure 5:
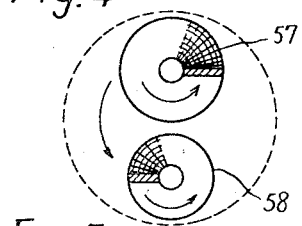

In FIGURE 5, the diameter of the forwarding feeder 57 is larger than the diameter of the returning feeder 58, and as a result the forwarding feeder is having a larger raw material moving efficiency than the returning feeder. By the way, the direction of pitch of the feeders 57 and 58 is same as that of the feeders 12 and 13 shown in FIGURE 1.

Figure 6:
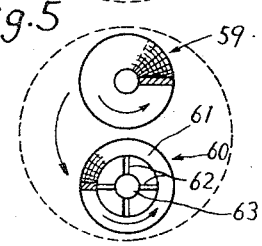

In FIGURE 6, although the forwarding feeder 59 is same as the forwarding feeder 12 of FIGURE 1, the width of the screw of the returning feeder 60 is narrower than that of the returning feeder 13 of FIGURE 1, and the screw 61 is attached to the rotary shaft 63 by means of proper arms 62, 62. . . . Accordingly, the raw material moving efficiency of the forwarding feeder 59 is larger than that of the returning feeder 60. In addition to this arrangement, it may be so done, otherwise, that a cut-off portion may be provided in the screw of the returning feeder or the screw may be formed as a plurality of separate wings instead of a continuous helical one so that the effective area of the screw of the returning feeder is decreased relative to the forwarding feeder in order to suppress the returning action.

Figure 7:
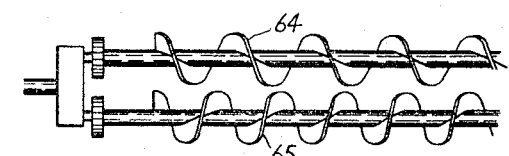
FIGURE 7 is a partially omitted side view of still another example of the feeder in accordance with this invention.

In FIGURE 7, the screw pitch of the forwarding feeder 64 is larger than that of the returning feeder 65. As a result thereof, the moving speed of the raw material during the mixing is larger in forwarding direction than returning direction, thus the exhaustion of the raw material is expedited.

In FIGURE 8, although the pitch and the diameter of the forwarding feeder 66 is same as those of the returning feeder 67, the rotation speed of the forwarding feeder 66 is higher. In this example of embodiment, the length of the rotary shaft 68 of the forwarding feeder 66 and the length of the rotary shaft 69 of the returning feeder 67 are different, and the diameter of a gear 70 which is provided at an end of the forwarding feeder shaft 68 is smaller than the diameter of a gear 71 which is provided at an end of the returning feeder shaft 69. Further, internal gears 73 and 74 across a spacer ring are provided at the opening edge of the support 34, the gear 70 is engaging with the internal gear 73 and the gear 71 is engaging with the internal gear 74. In this case, as the effective radius ratio of the internal gears 73 and 70 is smaller than the effective radius ratio of the internal gears 74 and 71, the gear 70 is rotated at a higher speed increasing the rotation speed of the forwarding feeder 66 higher than the rotation speed of the returning feeder 67, and the exhaustion operation for the raw material is increased.

In some cases, it may be desired to add liquid raw material of some quantity to the powder or particle raw material. Or, in such case as plastic raw material which is very easily chargeable it may be desirable to add just a little quantity of water or surface active agent in order to prevent formation of lumps due to the charge or adsorption of the raw material by the container. In such cases as the above, a spray nozzle may be inserted to the vicinity of the supply inlet 8 of the chamber 1 so that a desired liquid is sprayed toward the raw material 53 within the chamber.

In the example of FIGURES 1 and 2, nozzles 75 and 75 are inserted penetrating through a place near the supply inlet 8 in the cover 7. The nozzle 75 is of a duplex tube-like contour consisting of an inner tube 76 through which air is supplied and an outer tube 77 through which a liquid is supplied. At the outer surface of the outer tube 77 a flange 78 is provided. The nozzle is inserted into a short cylinder 79 which is provided in the cover 7, the flange 78 is made to ride on an end face of the short cylinder, the flange is pressed down by a nut 80 which engages with the outer periphery of the short cylinder 79, and thereby the nozzle 75 is firmly attached to the cover 7.

If the raw material becomes wet by the spray and tends to adhere to the wall face of the mixing chamber 1, such cylindrical contour as is shown in FIGURE 3 may be employed for the mixing chamber 1.

What is claimed:

1. A mixing machine for mixing powder or particle raw material, comprising a mixing chamber having a raw material supply inlet at one end thereof and a raw material exhausting outlet at the other end, a plurality of screw feeders arranged around a central line within said chamber, and driving means for causing all of said screw feeders to revolve around said central line, in which at least one of said screw feeders is so adapted as to forward said raw material from said supply inlet towards said exhausting outlet, and remainder of said screw feeders is so adapted as to return said raw material towards said supply inlet.

2. A mixing machine according to claim 1, in which said mixing chamber has a U-shaped section and upper part of which is covered with a cover, and said central line is present at the center of the curvature of chamber wall of said U-shape.

3. A mixing machine according to claim 1, in which said mixing chamber is of a cylindrical contour having said central line at the center thereof and having an inner diameter which is a little larger than the range of of motion of said screw feeders.

4. A mixing machine according to claim 1, in which two feeders each at each side of said central line are provided, one of said feeders is to forward said raw material towards said exhausting outlet, and the other is to return said raw material towards said supply inlet.

5. A mixing machine according to claim 1, in which an even number which is more than two of said feeders are arranged around said central line, and feeders for forwarding said raw material towards said exhausting outlet and feeders for returning said raw material towards said supply inlet respectively are alternatingly arranged around said central line.

6. A mixing machine according to claim 1, in which screw pitches of said feeders for forwarding said raw material towards said exhausting outlet and said feeders for returning said raw material towards said supply inlet are mutually reverse, and all of these feeders are rotating in same direction.

7. A mixing machine according to claim 1, in which raw material forwarding efficiency of said feeders for forwarding said raw material towards said exhausting outlet is chosen to be larger than that of said feeders for returning said raw material towards said supply inlet.

8. A mixing machine according to claim 7, in which screw diameter of said feeders for forwarding said raw material towards said exhausting outlet is chosen to be larger than that of said feeders for returning said raw material towards said supply inlet.

9. A mixing machine according to claim 7, in which a portion of said screw of said feeder for returning said raw material towards said supply inlet is cut off and thereby the raw material moving efficiency of said feeder is lower than that of said feeder for forwarding said raw material towards said exhausting outlet.

10. A mixing machine according to claim 7, in which screw pitch of said feeder for forwarding said raw material towards said exhausting outlet is chosen to be larger than that of said feeder for returning said raw material towards said supply inlet.

11. A mixing machine according to claim 7, in which rotation speed of said feeder for forwarding said raw material towards said exhausting outlet is chosen to be higher than that of said feeder for returning said raw material towards said supply inlet.

12. A mixing machine according to claim 1, in which one or more liquid spray nozzles are open within said mixing chamber at a position near said supply inlet.

13. A mixing machine according to claim 1, in which shafts of said feeders are tubular through which core rods are inserted respectively, each two ends of said core rods are exposed from said shafts at the outside of said mixing chamber and are coupled by coupling members to a rotary shaft which is arranged on said central line, and driving means for providing revolving motion of said feeders are coupled to said rotary shaft.

14. A mixing machine according to claim 13, in which a gear is provided at one end of each of said tubular feeder shafts, one or more internal gears for engaging with said gears are attached to a support which is provided rotatably around said rotary shaft, and said driving means and said support are so coupled that rotating motion of said feeders is provided.

References Cited

UNITED STATES PATENTS

| | | | |
|---|---|---|---|
| 2,890,865 | 6/1959 | Costa | 259—5 X |
| 2,947,524 | 8/1960 | Bridges | 259—6 |
| 3,176,966 | 4/1965 | Rietz | 259—6 X |
| 3,345,442 | 10/1967 | Oxel | 259—6 X |

ROBERT W. JENKINS, *Primary Examiner.*

U.S. Cl. X.R.

259—97